United States Patent
Geibel et al.

(10) Patent No.: US 7,905,518 B2
(45) Date of Patent: Mar. 15, 2011

(54) COLLAPSIBLE VEHICLE STEERING COLUMN

(75) Inventors: Dean E. Geibel, New Cumberland, PA (US); Joseph B. Shuey, Camp Hill, PA (US)

(73) Assignee: FCI Americas Technology, Inc., Carson City, NV (US)

( * ) Notice: Subject to any disclaimer, the term of this patent is extended or adjusted under 35 U.S.C. 154(b) by 232 days.

(21) Appl. No.: 12/218,094

(22) Filed: Jul. 10, 2008

(65) Prior Publication Data

US 2009/0020996 A1     Jan. 22, 2009

Related U.S. Application Data

(60) Provisional application No. 60/961,238, filed on Jul. 19, 2007.

(51) Int. Cl.
*B62D 1/00*     (2006.01)
(52) U.S. Cl. .............. 280/777; 74/492; 411/20; 411/383
(58) Field of Classification Search .................. 280/777; 74/492, 493; 411/19, 20, 383, 384
See application file for complete search history.

(56) References Cited

U.S. PATENT DOCUMENTS

| | | | |
|---|---|---|---|
| 3,464,284 A | 9/1969 | Fergle | 74/492 |
| 3,492,888 A * | 2/1970 | Yoshihiro et al. | 74/492 |
| 3,600,003 A | 8/1971 | Carey | 280/150 AB |
| 4,968,058 A | 11/1990 | Jones | 280/777 |
| 5,242,195 A * | 9/1993 | Wendling | 280/777 |
| 5,893,580 A | 4/1999 | Hoagland et al. | 280/731 |
| 6,170,862 B1 | 1/2001 | Hoagland et al. | 280/731 |
| 6,227,571 B1 * | 5/2001 | Sheng et al. | 280/777 |
| 6,339,970 B1 * | 1/2002 | Blex | 74/492 |
| 6,574,540 B2 * | 6/2003 | Yokota et al. | 701/45 |
| 6,578,872 B2 | 6/2003 | Duval et al. | 280/777 |
| 6,749,222 B2 | 6/2004 | Manwaring et al. | 280/777 |
| 7,077,432 B2 | 7/2006 | Manwaring et al. | 280/777 |
| 7,347,451 B2 | 3/2008 | Riefe et al. | 280/777 |
| 7,461,859 B2 * | 12/2008 | Fogle et al. | 280/739 |
| 2003/0006602 A1 | 1/2003 | Waid et al. | 280/777 |

* cited by examiner

*Primary Examiner* — Eric Culbreth
(74) *Attorney, Agent, or Firm* — Harrington & Smith

(57) ABSTRACT

A vehicle safety system including a steering column, a keying member, and a squib. The steering column includes a first steering column section longitudinally slidably connected to a second steering column section. The keying member locates the first and second steering column sections at a fixed longitudinal position relative to each other. The squib is located relative to the keying member to exert a force on the keying member when the squib is initiated to thereby allow the first and second steering column sections to longitudinally slide relative to each other to shorten a length of the steering column.

23 Claims, 6 Drawing Sheets

COLLAPSIBLE VEHICLE STEERING COLUMN

CROSS REFERENCE TO RELATED APPLICATION

This application claims priority under 35 U.S.C. §119(e) to U.S. Provisional Patent Application No. 60/961,238 filed Jul. 19, 2007 which is hereby incorporated by reference in its entirety.

BACKGROUND OF THE INVENTION

1. Field of the Invention

The invention relates to a vehicle steering column and, more particularly, to a collapsible vehicle steering column.

2. Brief Description of Prior Developments

U.S. Pat. No. 6,578,872 B2 discloses a steering column with pyrotechnic charges. The steering column has two telescoping members held at an extended position relative to each other by energy absorbing coil springs. The pyrotechnic charges can be actuated to selectively disengage the coil springs and provide a variable energy absorbing system. Other steering column designs using pyrotechnic charges are described in U.S. Pat. Nos. 6,749,222 B2 and 7,077,432 B2.

Steering column shear pins are also know which are set to fracture at a predetermined force when a driver impacts the steering wheel. Another conventional approach is to use a shock absorber in the steering column. However, this is expensive.

SUMMARY OF THE INVENTION

In accordance with one aspect of the invention, a vehicle safety system is provide including a steering column, a keying member, and a squib. The steering column includes a first steering column section longitudinally slidably connected to a second steering column section. The keying member locates the first and second steering column sections at a fixed longitudinal position relative to each other. The squib is located relative to the keying member to exert a force on the keying member when the squib is initiated to thereby allow the first and second steering column sections to longitudinally slide relative to each other to shorten a length of the steering column.

In accordance with another aspect of the invention, a vehicle safety system is provided comprising a steering column, a shear pin, and a squib. The steering column comprises a first steering column section movably connected to a second steering column section. The shear pin provides a connection between the first and second steering column sections to locate the first and second steering column sections at a first location relative to each other. The shear pin comprises a reduced cross-sectional shear area adapted to break at a predetermined force to thereby allow the first and second steering column sections to collapse relative to each other. The squib is configured to exert a force on the shear pin to disconnect the connection and allow the first and second steering column sections to collapse relative to each other from the first location. The squib and the shear pin provide redundant systems such that the steering column can collapse either when the squib is initiated to disconnect the connection or when the predetermined force is applied to the shear pin.

In accordance with another aspect of the invention, a vehicle steering wheel safety system is provided comprising an air bag squib; a steering column squib; a controller connected to the air bag squib and the steering column squib; and sensors connected to the controller. The controller is configured to initiate the squibs at different times relative to each other based upon different sensor signals from the sensors to the controller.

In accordance with another aspect of the invention, a method is provided comprising connecting a first steering column section of a vehicle steering column to a second steering column section, wherein the second steering column section is longitudinally slidable on the first steering column section; fixing the second steering column section at a fixed longitudinal location relative to the first steering column section by a keying member; and connecting a squib to the second steering column section at the keying member. When the squib is initiated the keying member is moved and thereby allows the first and second steering column sections to longitudinally slide relative to each other.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
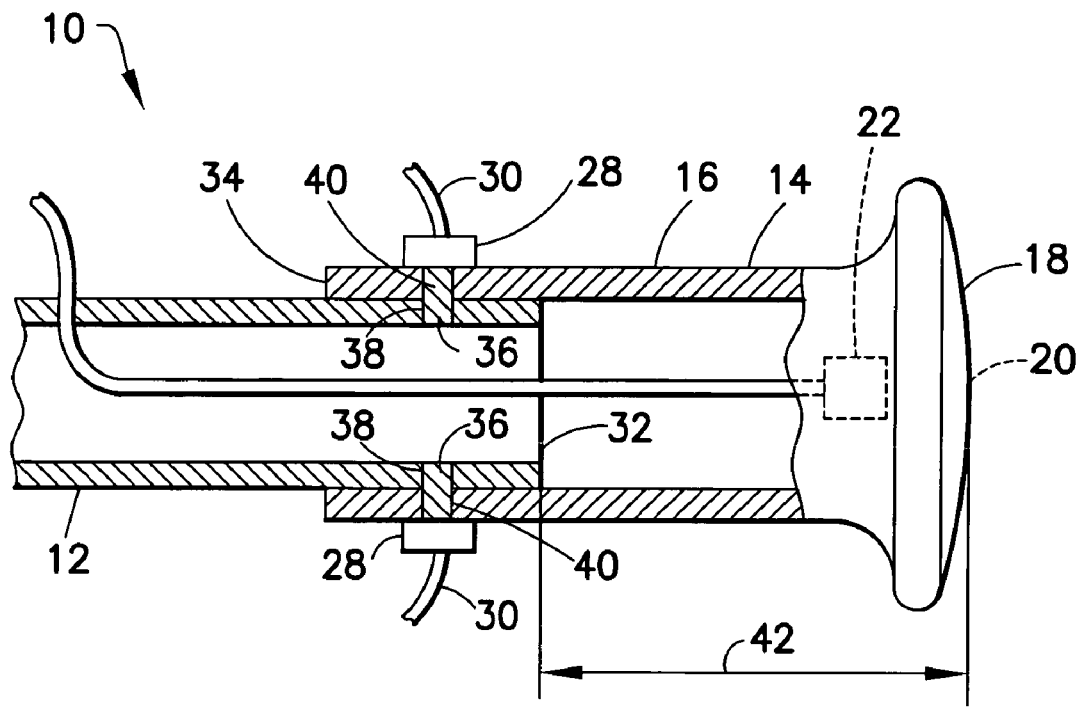
FIG. 1 is a side view with a cut away section of a vehicle steering column incorporating features of the invention.

Referring to FIG. 1, there is shown a side view with a cut away section of a vehicle steering column 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

The steering column 10 generally comprises a first section 12 and a second section 14. The second section 14 is stationarily, telescopingly arranged on the first section 12. However, in alternate embodiments, the first and second sections could be connected to each other in any suitable type of potentially movable connection. The first section 12 is substantially longitudinally stationarily connected to the vehicle, but is adapted to axially rotate, and may be pivotable. In one type of embodiment the first section 12 could be connected to the vehicle's engine such that, if the engine falls down from the vehicle chassis during a vehicle collision, the first section 12 can be pulled with it.

The second section 14 comprises a tubular column section 16 and a steering wheel section 18. The second section 14 could include other features including a gear shift, wiper and other feature controls, a steering wheel tilt feature, a steering column telescoping feature, or any other conventional steering wheel column feature(s) known in the art. The steering wheel section 18 includes an airbag 20 with an electrically controlled initiator or squib 22. A squib is a small pyrotechnic device. For the airbag squib 22 can be electrically ignited to initiate inflation of the airbag 20.

Figure 2:
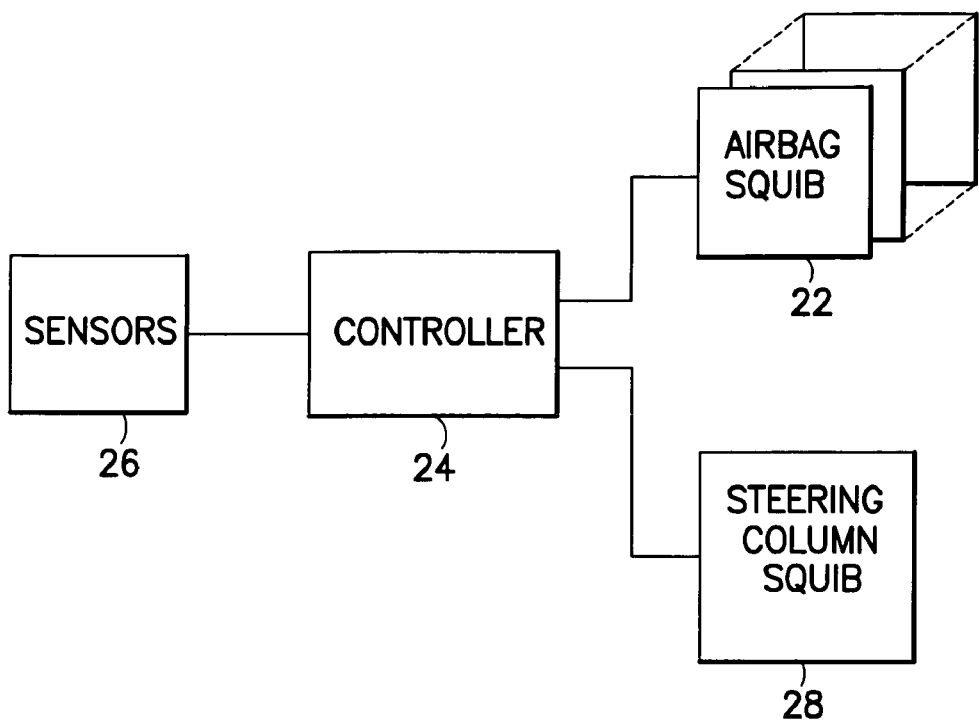
FIG. 2 is a block diagram of a vehicle safety system for use with the steering column shown in FIG. 1.

Referring also to FIG. 2, the safety system of the vehicle includes a controller 24, sensors 26, and multiple airbag squibs 22. As is known in the art, the controller 24 is adapted to actuate the airbag squibs (to inflate airbags) based upon input from the sensors 26, such as collision, occupant position or occupant weight sensors. In addition to the airbag squibs 22, the safety system of the present invention includes at least one steering column squib 28. In the embodiment shown in FIG. 1, the vehicle has two steering column squibs 28. However, in alternate embodiments more or less than two steering column squibs could be provided. The squibs 28 are connected to the controller 24 by wires 30, and usually a squib connector, such as a scoop-proof squib connector. In this embodiment, the steering column squibs are connected to the second section 14 of the steering column on the tubular column section 16.

The first and second sections 12, 14 of the steering column are fixedly, stationarily connected to each other by the end 32 of the first section 12 being located inside the end 34 of the tubular column section 16, and keying members or shear pins 36 being located in aligned pin holes 38, 40 of the respective first and second sections. In this embodiment the steering column has two of the pins 36. However, in alternate embodiments more or less than two pins could be provided. In addition, although the members 36 are being described as pins in this embodiment, in alternate embodiments the keying or shear member(s) could have any suitable sized and shape.

Figure 9:
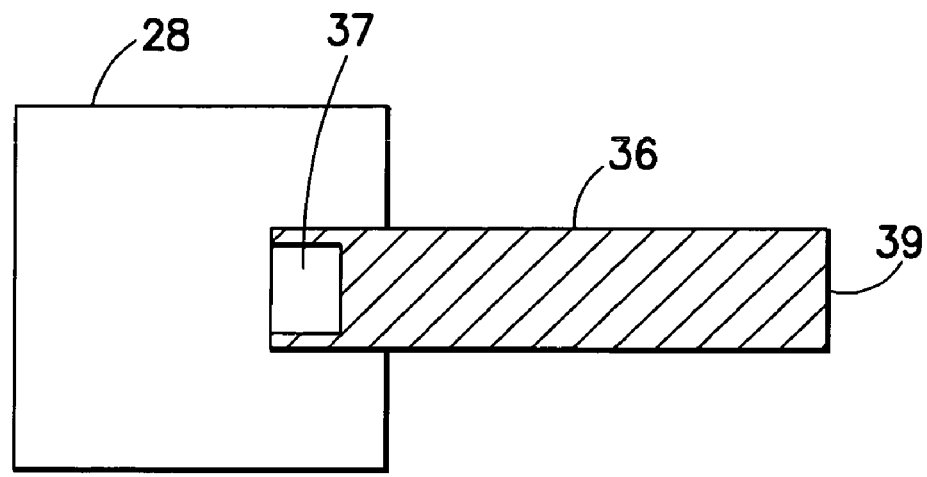
FIG. 9 is a view illustrating a cartridge having a squib and keying member.
Figure 10:
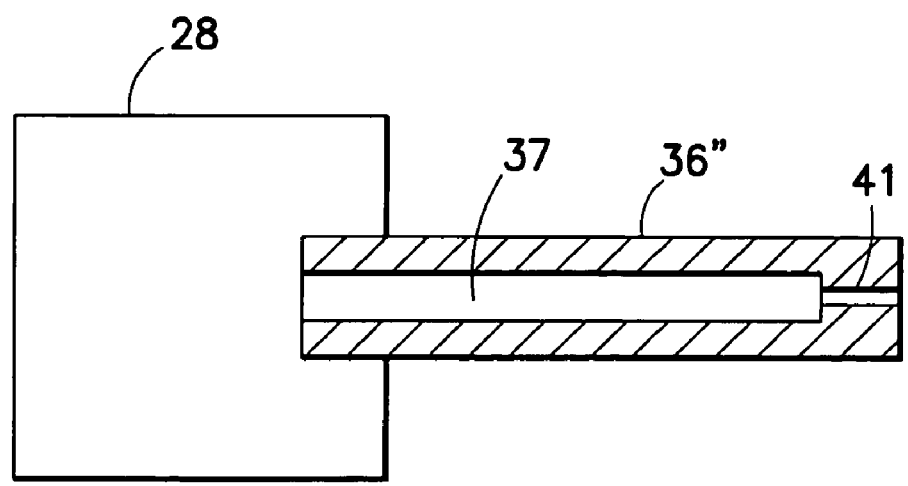
FIG. 10 is a view illustrating an alternate embodiment of the cartridge shown in FIG. 9.

The steering column squibs 28 are located at the outside end of the pins 36, and the two may be friction fit together to define a cartridge. An example of a cartridge is shown in FIG. 9. The pins 36 or keying members may have a partially hollow section and may include an opening or open end 37 adjacent to the steering column squibs 28. Hot, expanding gas from an initiated squib 28 can enter the hollow section and exert a direct force on the pin to force the pin 36 away from the steering column squib 28. An opposed end 39 of the pin 36 opposite the steering column squib 28 may be closed or partially closed. Referring also to FIG. 10, if partially closed, the orifice 41 can be increased or decreased in size to adjust the amount of pin ejection force in a partially hollow pin. When the squibs 28 are actuated, they can cause the pins 36 to no longer stationarily attach the first section 12 to the tubular column section 16.

Figure 3:
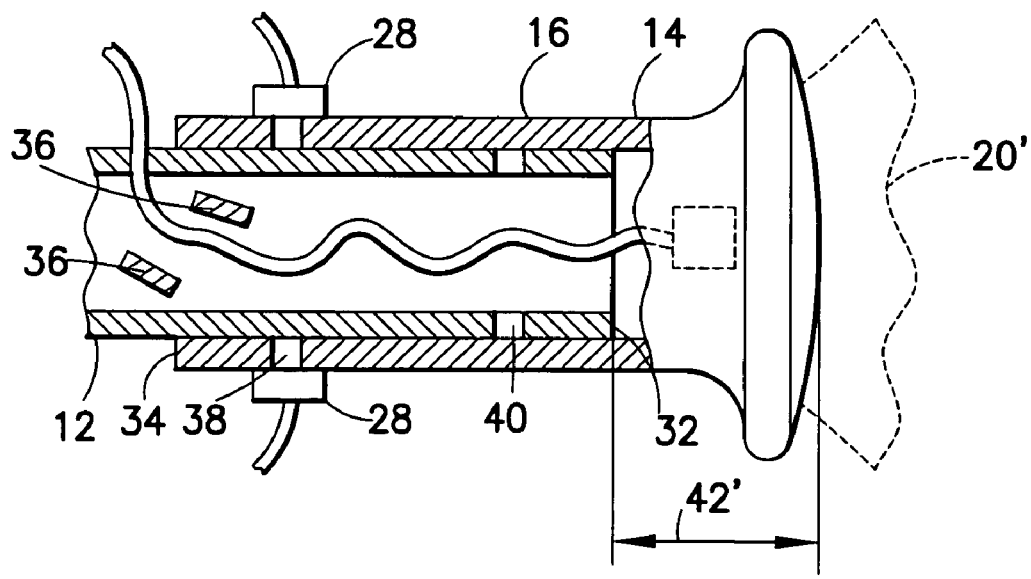
FIG. 3 is a view as in FIG. 1 showing the steering column moved to a collapsed location.

As seen in FIG. 3, in the embodiment shown, the squibs 28 can displace the pins 36 out of their holes 38, 40 and into the interior of the first section 12. To help facilitate movement of the pins 36, the pins 36 may have friction-reducing material or friction-reducing sleeves positioned adjacent to an outer surface of the pins 36. The material or sleeves may be uniform or may include a split at weakened portions of the pins 36. In an alternate embodiment, the squibs 28 might merely sever or displace a portion of each of the pins rather than the whole pins. Alternatively, the squibs 28 might merely move a latch which otherwise retains the first section 12 and the tubular column section 16 in their normal home stationary position.

Once the pins 36 no longer retain the first section 12 to the tubular column section 16 in a stationary position, the second section 14 is able to longitudinally slide on the first section 12 to a collapsed position as shown in FIG. 3. The original distance 42 to the front of the steering wheel section 18 can be reduced to a shorter distance 42'. Thus, during a vehicle collision, such as a head-on collision, the steering column can collapse or reduce in length and the steering wheel section 18 can be relatively easily moved away from the driver. This can occur in conjunction (slightly before, during or slightly after) inflation of the steering wheel airbag as illustrated by 20' in FIG. 3. Thus, timing of the airbag squib(s) initiation versus timing of the steering column squib(s) initiation can be different. In one type of embodiment, the controller could be programmed to initiate the squibs 22, 28 at different conditions. For example, in one type of embodiment the controller could be programmed to initiate the steering column squib(s) 28 when an impact is sensed at a vehicle speed of 10 miles per hour or greater, but the controller could be programmed to initiate the airbag squib(s) 22 when an impact is sensed at a vehicle speed of 30 miles per hour or greater. This would save a considerable amount of repair costs for the vehicle owner by not having to replace airbags for low impact collisions. In an alternate embodiment, the steering column squib(s) 28 can be initiated by the controller only if the calculated force (F=ma; a=d/t*t; v=d*t) of the driver on the steering column or the steering column on the driver is less than the force needed to shear the pins 36. This permits potentially beneficial energy-absorbing impact between the steering wheel/column and larger mass drivers but can help to elevate injury to drivers who have a smaller mass or a lower seated height. In other alternate embodiments, any suitable impact or vehicle sensed parameters could be used to vary the initiation of the squibs 22, 28 relative to each other. However, when both squibs 22, 28 are initiated, the inflated airbag 20' can be moved, at least slightly, away from the driver as well as the steering wheel section 18. In an alternate embodiment, the airbag squib might be initiated before the steering wheel squib, such as the steering wheel squib(s) only be initiated at higher speed or force impacts versus the airbag squib(s).

In one type of alternate embodiment, the pins 36 are preferably sized and shaped to have a weakened section at the joint of each pair of the holes 38, 40. However, in alternate embodiments, a weakened section might not be provided.

With the present invention, a digital type of connection can be provided between the two sections 12, 14. In particular, the two sections 12, 14 are either stationarily connected by the pins 36 or the two sections 12, 14 are not stationarily connected by the pins 36.

In one type of embodiment the airbag squib(s) 22 can be used as the steering column squibs 28. In this alternate embodiment there would be no need for separate steering column squibs because the airbag squib(s) would perform this function. Thus, the invention can allow for collapse of a steering column using explosive airbag initiators. When the airbags deploy, the steering column anti-telescoping pins/other mechanisms are jarred free by the initiator explosion from the airbag squib(s).

A problem with use of only steering column shear pins in a conventional steering column which do not use a squib is that they are set to fracture only at a predetermined force by impact with the driver. If the driver has a slight build or if the impact with the steering wheel is the result of a low energy collision, the steering column does not collapse.

Figure 8:
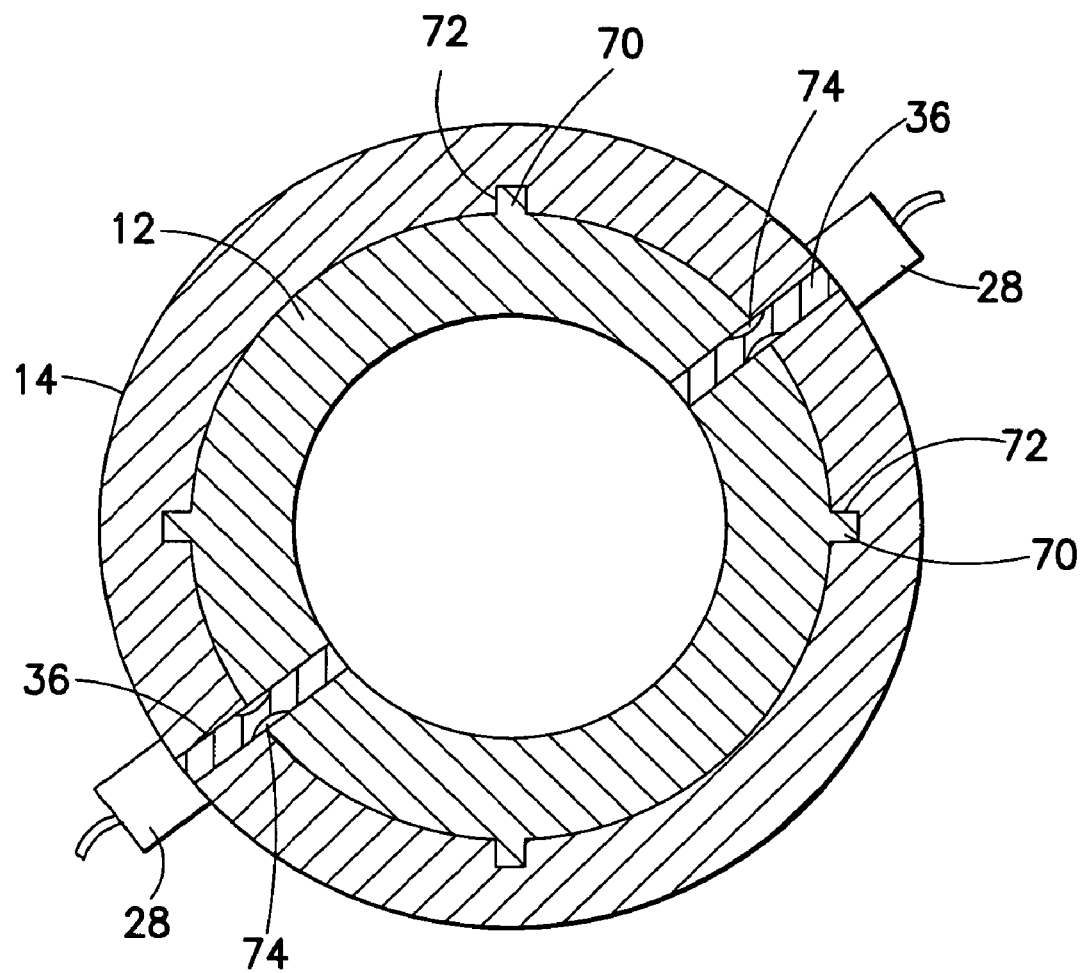
FIG. 8 is a cross sectional view of the steering column shown in FIG. 1 showing the longitudinally slidable connection between the steering column sections and the connection for axial rotation of the steering column sections with each other.

As noted above, in one type of embodiment the keying members 36 are preferably shear pins. An example of the shear pins are shown in FIG. 8. The shear pins 36 have a reduced cross-sectional shear area 74. The reduced cross-sectional shear area 74 is adapted to break at a predetermined force. In the event the steering wheel squibs 28 are not actuated, such as a low impact collision or a malfunction in the controller 24 for example, the second section 14 can still collapse on the first section 12 by the pins 36 shearing from the force of the driver impacting against the steering wheel section 18. Thus, the present invention can provide a redundant or dual system to insure that the steering wheel column collapses in a vehicle accident; the shear pins 36 being moved or being sheared by the squibs 28, or the shear pins 36 being sheared by force of the driver on the steering wheel section 18. In a very high speed or high impact collision, aspects of both systems could occur to disconnect the connection provided by the shear pins.

In one type of embodiment the keying members 36 can provide the interlink between the first and second steering column sections such that the first steering column section is axially rotated when the second steering column section is axially rotated. However, additional or alternative means could be provided to interlink the two steering column sections to each other for axial rotation together, such as interlocking teeth/grooves on the exterior of the first steering column section and the interior of the second steering column section for example, which still allow the second steering column section to longitudinally slide on the first steering column section. With this type of interlinking, the steering column can still be used to turn the vehicle wheels when the steering column is in the collapsed condition. An example is shown in FIG. 8 with the projections 70 in the grooves 72. Thus, the steering column can still be functional even after it has collapsed. In an alternate embodiment, it may be desired to permanently disable the steering column from steering until the steering column can be properly repaired, such that the steering column cannot still be used to turn the vehicle wheels after the keying members 36 have been moved from their interlinking positions between the steering column section or have been sheared.

Figure 4:
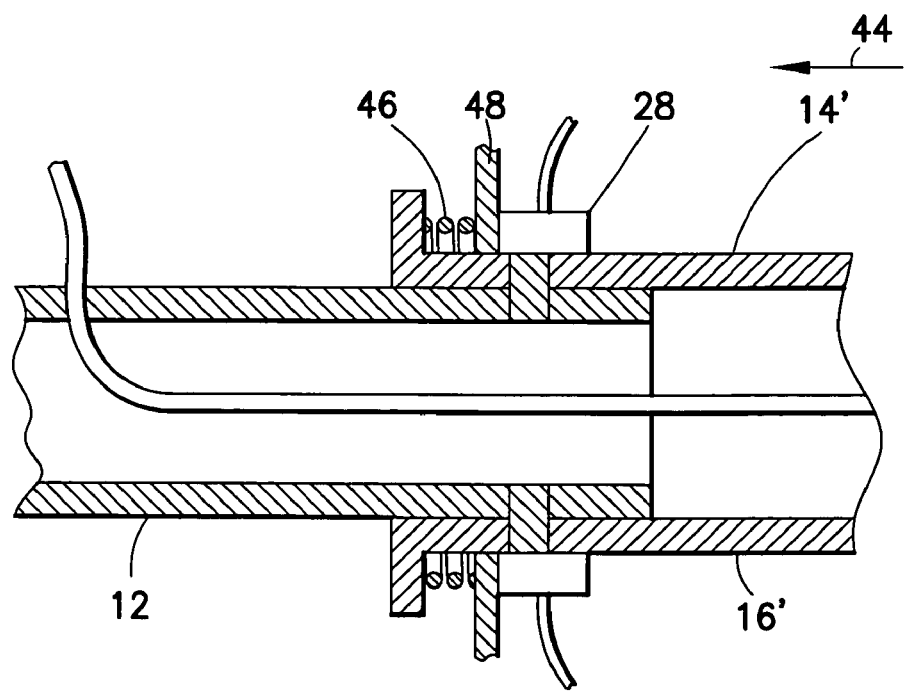
FIG. 4 is a cross sectional view of a portion of a steering column of an alternate embodiment of the invention.

Referring also to FIG. 4, the steering wheel portion of the column can also be spring, pneumatically, or hydraulically loaded in the collapse direction 44, so that the steering wheel section is urged away from the driver when the anti-telescoping pins 36 are ejected. In the embodiment shown in FIG. 4, at least one spring 46 is provided between the tubular column section 16' of the second section 14' and a stationary section 48 such as either a portion of the vehicle chassis/frame or a portion of the first section 12. The force of the airbag 20' hitting the driver would also be reduced since the column can move in the opposite direction upon impact.

Figure 5:
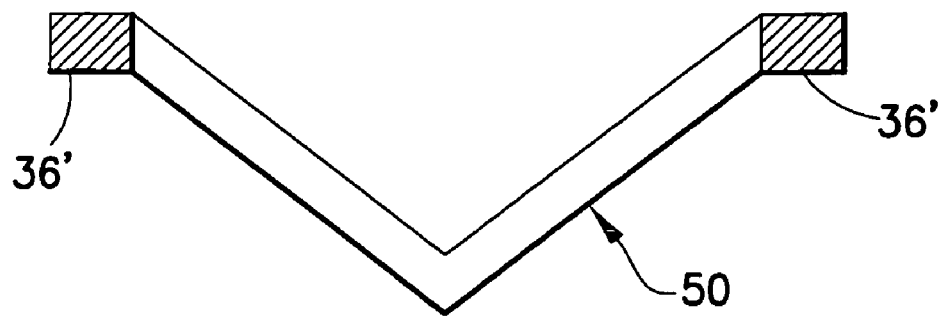
FIG. 5 is a side view with cut away sections of an alternate embodiment of a pin member having two opposite pin sections.

Referring also to FIG. 5, an alternate embodiment of the pins 36' is shown. In this embodiment the pins 36' are connected to each other by a connector 50. The connector 50 can be a band or metal strip for example. If a metal strip, the strip could act as a spring to retain the pins 36' in their holes 38, 40 until ejected by the squibs 28. This can make installation and retainment of the pins 36' into the holes 38, 40 easier. The connection 50 can allow the pins 36' to remain connected to each other even after the pins 36' are ejected from the holes in the steering column members. Thus, during servicing, the assembly 36', 50 can be easily located and removed or replaced. This can prevent the pins being inadvertently left behind in the steering column after servicing and potentially interfering with other components.

Figure 6:
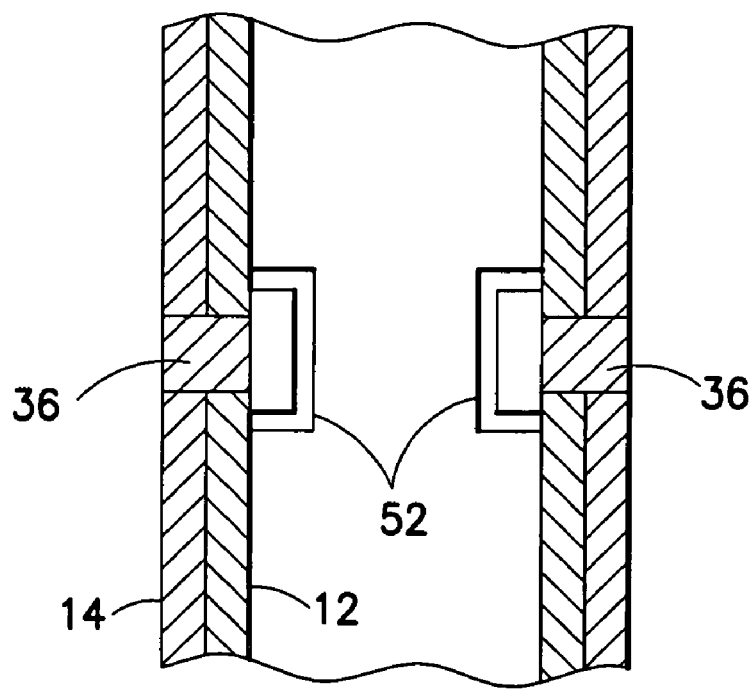
FIG. 6 is a schematic cross sectional view showing another alternate embodiment of the invention.

Referring also to FIG. 6, another alternate embodiment is shown. In this embodiment the first section 12' includes caps 52 located at the inside of the holes 38. The caps 52 can capture the pins 36 after they are ejected by squibs 28 to prevent the pins from interfering with other components or coming out of the steering column.

Figure 7:
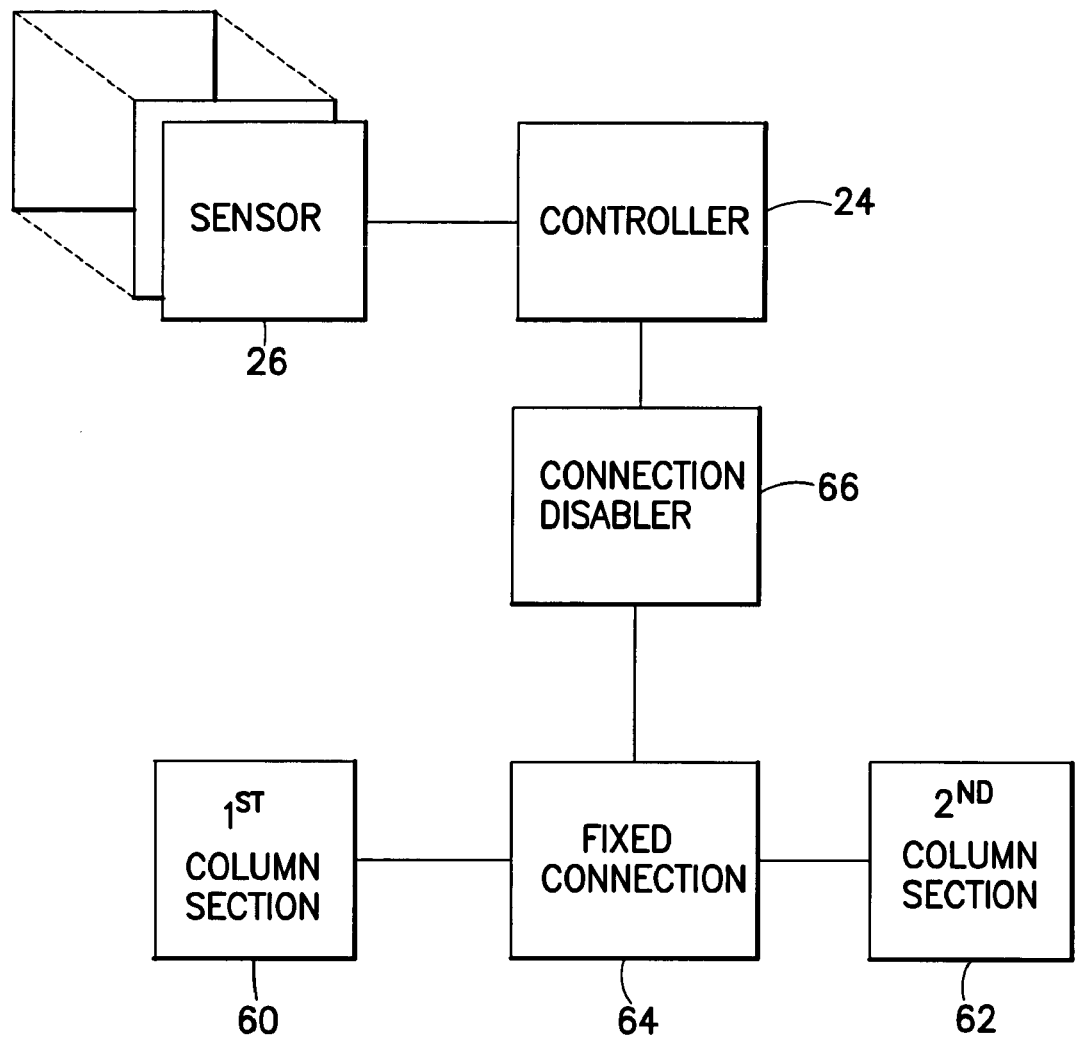
FIG. 7 is a block diagram of another alternate system incorporating features of the invention.

Referring also to FIG. 7, the first and second column sections 60, 62 of a steering column can be fixed to each other by a fixed connection 64. A connection disabler 66 is provide to disable the fixed connection 64 to enable the two sections 60, 62 to move relative to each other. The disabler 66 is controlled by the controller 24 which receives signals from the sensors 26. The two sections 60, 62 could be spring biased towards the collapsed position, but held in an extended position by the fixed connection 64. The fixed connection 64 might be adjustable, such as with an adjustable telescoping steering column. Any suitable fixed connection could be provided. The invention might not be limited to a telescoping steering column arrangement.

It should be understood that the foregoing description is only illustrative of the invention. Various alternatives and modifications can be devised by those skilled in the art without departing from the invention. For example, features recited in the various dependent claims could be combined with each other in any suitable combination(s). Accordingly, the invention is intended to embrace all such alternatives, modifications and variances which fall within the scope of the appended claims.

What is claimed is:

1. A vehicle safety system comprising:
    a steering column comprising a first steering column section longitudinally slidably connected to a second steering column section;
    a keying member locating the first and second steering column sections at a fixed longitudinal position relative to each other; and
    a squib located relative to the keying member to exert a force on the keying member when the squib is initiated to thereby allow the first and second steering column sections to longitudinally slide relative to each other to shorten a length of the steering column,
    wherein the keying member comprises a shear pin having a reduced cross-sectional shear area adapted to break between the steering columns at a predetermined force without actuation of the squib.

2. A vehicle safety system as in claim 1 wherein the keying member is removably mounted between the first and second steering column sections.

3. A vehicle safety system as in claim 1 wherein the keying member is movably mounted on the first steering column section to be moved inward into the first steering column section when the squib is initiated.

4. A vehicle safety system as in claim 1 wherein the keying member is mounted in aligned holes of the first and second steering column sections.

5. A vehicle safety system as in claim 1 wherein at the fixed longitudinal position a second keying member is located between the first and second steering column sections and a second squib is located relative to the second keying member to exert a force on the second keying member when the second squib is initiated to thereby allow the first and second steering column sections to longitudinally slide relative to each other to shorten the length of the steering column.

6. A vehicle safety system as in claim 5 wherein the two keying members are located on opposite sides of the steering column and the two squibs are located on opposite sides of the steering column.

7. A vehicle safety system as in claim 1 wherein the squib is mounted to an exterior side of the second steering column section.

8. A vehicle safety system as in claim 1 further comprising a spring biasing the second steering column section towards a collapsed position relative to the first steering column section.

9. A vehicle safety system as in claim 1 wherein the keying member provides a connection between the first and second steering column sections, and wherein the shear area further comprising means for disconnecting the connection and allowing the first and second steering column sections to collapse relative to each other from the first location, when a predetermined force is applied to the second steering column section without the squib being initiated, wherein the squib and the means for disconnecting provide redundant systems such that the steering column can collapse either when the squib is initiated to disconnect the connection or when the predetermined force is applied to the second steering column section.

10. A vehicle safety system as in claim 1 further comprising an air bag squib and a controller connected to the squibs, wherein the controller is configured to initiate the squibs at various different timings relative to each other based upon varying different input signals from sensors of a vehicle.

11. A vehicle safety system as in claim 1 further comprising a cap located at an inside end of a hole in the first steering column section having the keying member therein, wherein the cap is configured to capture the keying member after the keying member is ejected by squib to prevent the keying member from interfering with other components or coming out of the steering column.

12. A vehicle safety system as in claim 1 wherein the keying member is at least partially hollow.

13. A vehicle safety system comprising:
  a steering column comprising a first steering column section longitudinally slidably connected to a second steering column section;
  a keying member locating the first and second steering column sections at a fixed longitudinal position relative to each other; and
  a squib located relative to the keying member to exert a force on the keying member when the squib is initiated to thereby allow the first and second steering column sections to longitudinally slide relative to each other to shorten a length of the steering column,
  wherein the keying member is a portion of a keying device comprising two of the keying members located on opposite sides of a connection of the keying device between the two keying members.

14. A vehicle safety system as in claim 13 wherein the connection comprises a spring biasing the keying members in opposite directions.

15. A vehicle safety system comprising:
  a steering column comprising a first steering column section movably connected to a second steering column section;
  a shear pin providing a connection between the first and second steering column sections to locate the first and second steering column sections at a first position relative to each other, wherein the shear pin comprises a reduced cross-sectional shear area adapted to break at a predetermined force to thereby allow the first and second steering column sections to move from the first position relative to each other towards a second different position relative to each other; and
  a squib configured to exert a force directly on the shear pin to disconnect the connection and allow the first and second steering column sections to move relative to each other from the first position towards the second position,
  wherein the squib and the shear pin are configured to provide redundant systems such that the steering column can move from the first position towards the second position either when the squib is initiated to disconnect the connection or when the squib is not initiated and the predetermined force is applied to the shear pin.

16. A vehicle safety system as in claim 15 wherein the second position comprises the first and second steering column sections being collapsed relative to the first position.

17. A vehicle safety system as in claim 15 wherein the vehicle safety system is configured to eject the shear pin from holes in the first and/or second steering column sections when the squib is initiated.

18. A method comprising:
  connecting a first steering column section of a vehicle steering column to a second steering column section, wherein the second steering column section is longitudinally slidable on the first steering column section;
  fixing the second steering column section at a fixed longitudinal location relative to the first steering column section by a keying member; and
  connecting a squib to the second steering column section at the keying member, wherein when the squib is initiated the keying member is moved and thereby allows the first and second steering column sections to longitudinally slide relative to each other,
  wherein the keying member comprises a shear pin with a weakened section adapted to shear between the first and second steering column sections when a predetermined force is applied between the first and second steering column sections without the squib being initiated.

19. A method as in claim 18 further comprising providing an air bag squib and connecting a controller to the squibs, wherein the controller is configured to initiate the squibs at different times relative to each other based upon different sensor signals from sensors connected to the controller.

20. A method as in claim 18 wherein connecting the first and second steering column sections to each other comprises providing a connection which allows the first steering column section to be axially rotated with the second steering column section regardless of whether the squib is initiated.

21. A method as in claim 18 wherein connecting the first and second steering column sections to each other comprises providing a connection which, after the squib is initiated, does not assist the first steering column section to be axially rotated when the second steering column section is axially rotated.

22. A method as in claim 18 wherein connecting the squib to the second steering column section at the keying member, such that when the squib is initiated the keying member is moved, connects the squib such that the squib is configured to eject at least a portion of the keying member from a hole in the first and/or the second steering column section.

23. A cartridge comprising:
  a squib section comprising pyrotechnic material for generating an expansion of gas when the pyrotechnic material is burned; and
  a keying pin section directly connected to the squib section, wherein the keying pin section is configured to be ejected from connection with the squib section when the pyrotechnic material is burned,
  wherein the cartridge is configured to be mounted on a vehicle steering wheel column, wherein the keying pin section comprises a shear pin with a weakened section adapted to shear between first and second steering column sections of the vehicle steering wheel column, without the squib being initiated, when a predetermined force is applied between the first and second steering column sections.

* * * * *